(12) United States Patent
Nakamura

(10) Patent No.: US 9,430,873 B2
(45) Date of Patent: Aug. 30, 2016

(54) SLICE DATA GENERATION DEVICE, SLICE DATA GENERATION METHOD, AND NON-TRANSITORY COMPUTER-READABLE STORAGE MEDIUM STORING COMPUTER PROGRAM THAT CAUSES COMPUTER TO ACT AS SLICE DATA GENERATION DEVICE OR TO EXECUTE SLICE DATA GENERATION METHOD

(71) Applicant: Roland DG Corporation, Hamamatsu-shi, Shizuoka (JP)

(72) Inventor: Yasutoshi Nakamura, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 56 days.

(21) Appl. No.: 14/339,507

(22) Filed: Jul. 24, 2014

(65) Prior Publication Data
US 2015/0029187 A1   Jan. 29, 2015

(30) Foreign Application Priority Data
Jul. 29, 2013  (JP) .................................. 2013-157081

(51) Int. Cl.
  *G06T 17/10*  (2006.01)
  *G06T 15/08*  (2011.01)
  *G06T 19/20*  (2011.01)
  *B33Y 50/00*  (2015.01)

(52) U.S. Cl.
  CPC .............. *G06T 17/10* (2013.01); *B33Y 50/00* (2014.12); *G06T 19/20* (2013.01); *G06T 2219/008* (2013.01); *G06T 2219/2021* (2013.01)

(58) Field of Classification Search
  None
  See application file for complete search history.

(56) References Cited

U.S. PATENT DOCUMENTS

| 2009/0040224 A1* | 2/2009 | Igarashi | .................. G06T 19/00 345/427 |
| 2010/0033179 A1* | 2/2010 | Hargreaves | ........ G01R 33/4833 324/309 |

FOREIGN PATENT DOCUMENTS

JP    06-246838 A    9/1994

* cited by examiner

*Primary Examiner* — Said Broome
(74) *Attorney, Agent, or Firm* — Keating and Bennett, LLP

(57) ABSTRACT

A slice data generation device generates slice data representing a cross-section obtained as a result of cutting a three-dimensional model and includes a reading section that reads information on a polygon mesh, a change section that changes phase information on the read polygon mesh such that a contour polyline that represents a contour obtained as a result of slicing the polygon mesh read by the reading section into round slices is capable of being acquired, a correction section that acquires the contour polyline from the polygon mesh, the phase information on which has been changed by the change section, and corrects the acquired contour polyline such that an area inside the acquired contour polyline is capable of being painted out; and a paint-out data generation section that paints out the area inside the contour polyline corrected by the correction section.

6 Claims, 14 Drawing Sheets

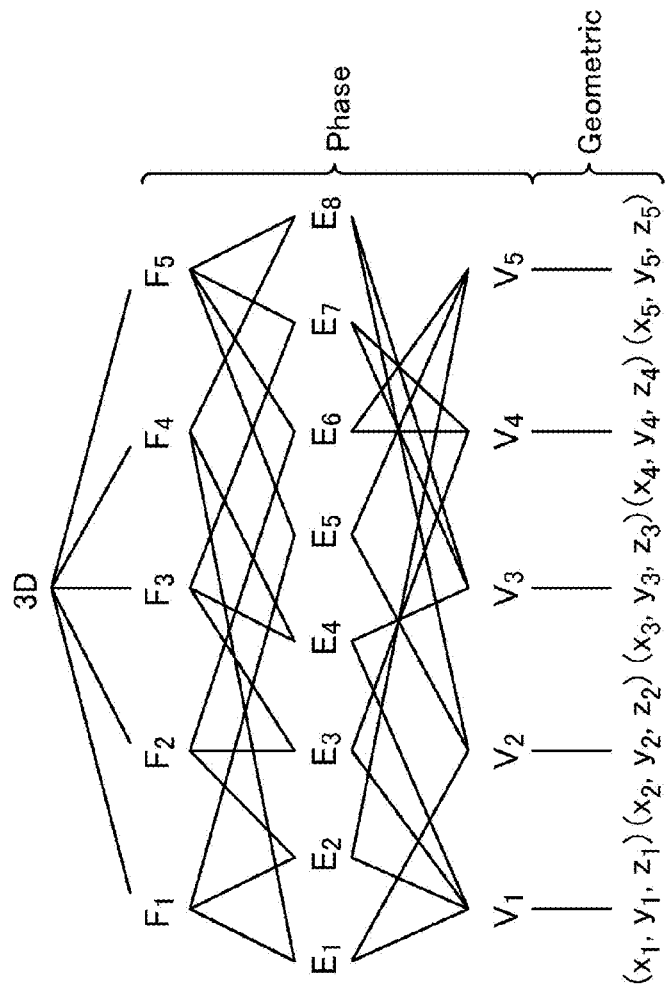
FIG.5B  Boundary representation 3D
The position of apex $V_i$ is $(X_i, Y_i, Z_i)$.
$(x_1, y_1, z_1) (x_2, y_2, z_2) (x_3, y_3, z_3) (x_4, y_4, z_4) (x_5, y_5, z_5)$
Boundary representation of polygon mesh
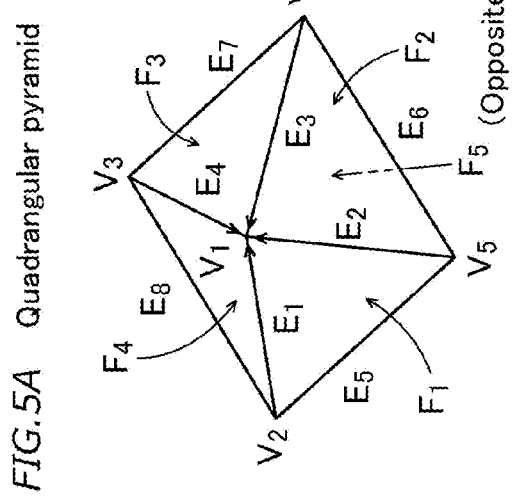
FIG.5A  Quadrangular pyramid
$V_i$, $E_i$, $F_i$ respectivley represent an apex, a ridge line and a plane; and the arrows each represent a direction set for the corresponding ridge line.

Correction of non-manifold

FIG. 8A  When the top end points of the two ridge lines in the Z axis direction have the same coordinate value
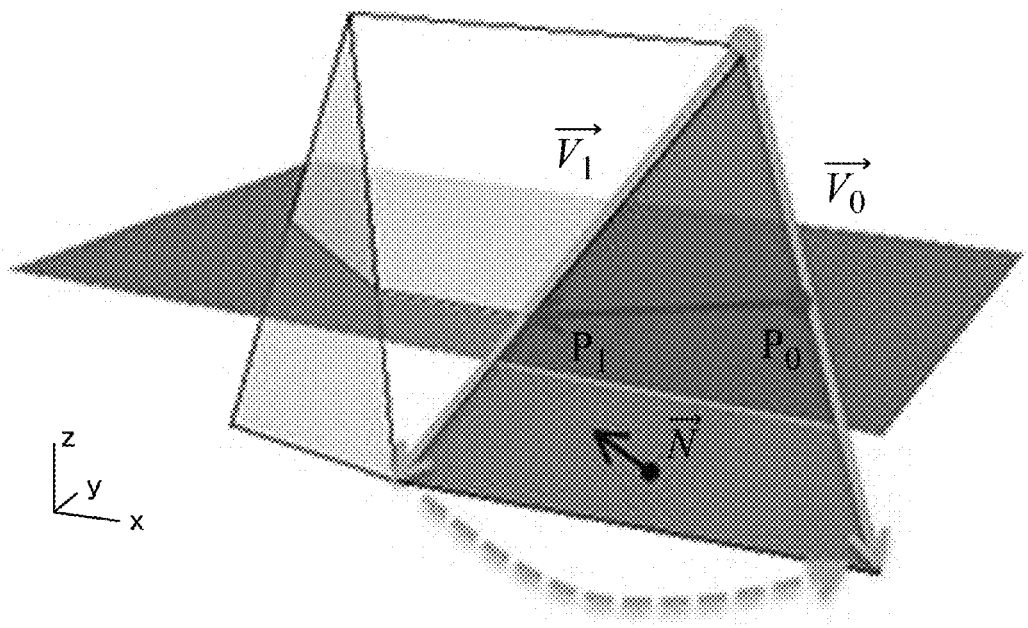
FIG. 8B  When the bottom end points of the two ridge lines in the Z axis direction have the same coordinate value
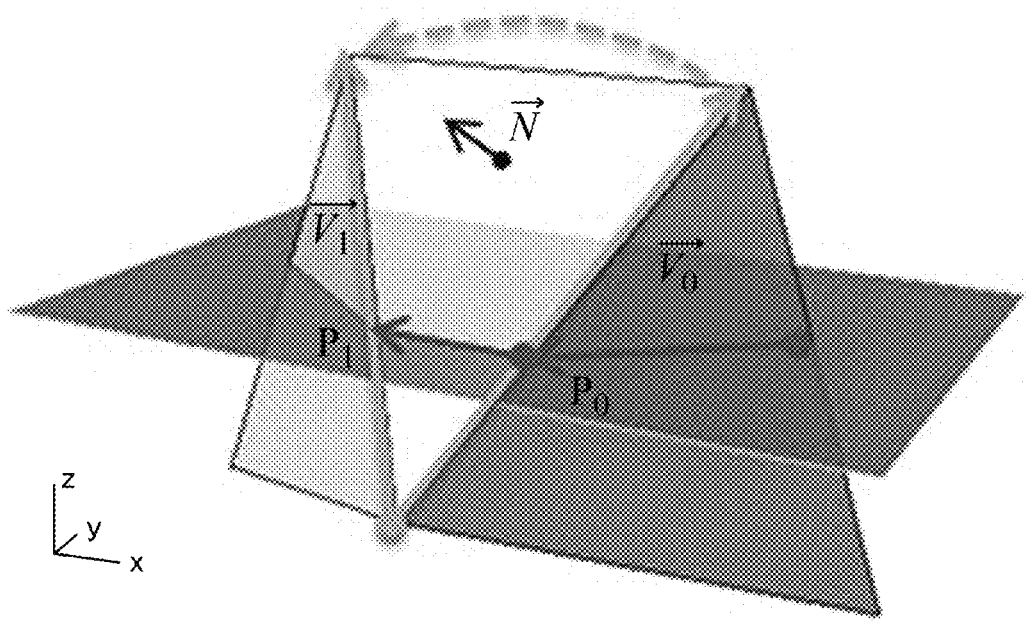
Connection of line segments of polygon mesh Paint-out results of scan conversion process in the case where line segments of polyline cross each other FIG. 10A  1. Resolution of self-crossing

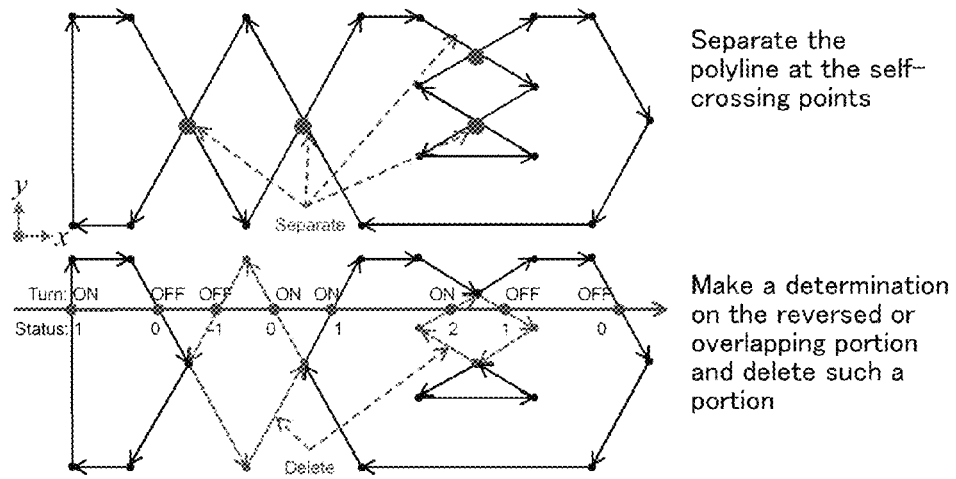

Separate the polyline at the self-crossing points

Make a determination on the reversed or overlapping portion and delete such a portion FIG. 10B  2. Resolution of crossing with other polylines

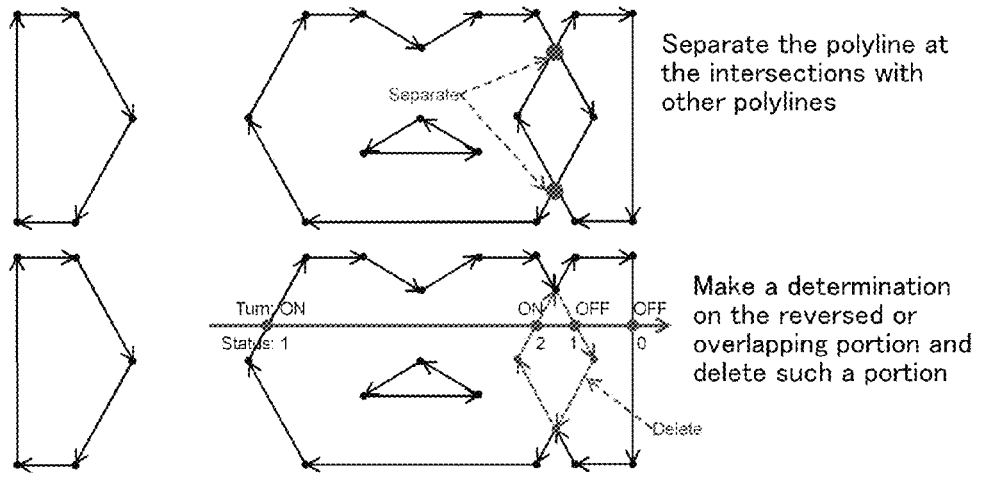

Separate the polyline at the intersections with other polylines

Make a determination on the reversed or overlapping portion and delete such a portion FIG. 10C  3. Synthesis

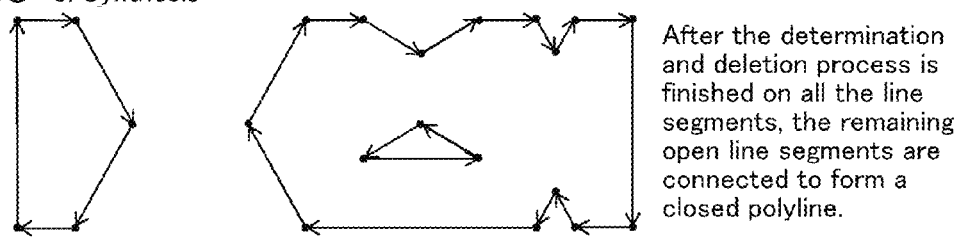

After the determination and deletion process is finished on all the line segments, the remaining open line segments are connected to form a closed polyline.

Synthesis of line segments of polyline

World coordinate system

Image coordinate system for bitmap

Image coordinate system for vector

World coordinate system and image coordinate system

Paint-out of inner area of polyline by scan conversion

Configuration of application software

SLICE DATA GENERATION DEVICE, SLICE DATA GENERATION METHOD, AND NON-TRANSITORY COMPUTER-READABLE STORAGE MEDIUM STORING COMPUTER PROGRAM THAT CAUSES COMPUTER TO ACT AS SLICE DATA GENERATION DEVICE OR TO EXECUTE SLICE DATA GENERATION METHOD

The present application claims priority from Japanese Patent Application No. 2013-157081 filed on Jul. 29, 2013, which is incorporated by reference herein in its entirety.

BACKGROUND OF THE INVENTION

1. Field of the Invention

The present invention relates to a slice data generation device, a slice data generation method, and a non-transitory computer-readable storage medium storing a computer program that causes a computer to act as the slice data generation device or to execute the slice data generation method.

2. Description of the Related Art

Conventionally, a three-dimensional modeling device that creates a three-dimensional model by use of a photo-curable resin is known. A photo-curable resin has a property of being cured when being irradiated with light such as visible light, ultraviolet light or the like.

Such a three-dimensional modeling device creates a three-dimensional model by, for example, the following technique. The three-dimensional modeling device uses a storage tank that stores a photo-curable resin. In the storage tank, a base member acting as a base for a three-dimensional model is located. The base member is immersed in the photo-curable resin. The three-dimensional modeling device irradiates the photo-curable resin stored in the storage tank with light. As a result of this process, the photo-curable resin is cured to a predetermined liquid layer thickness to form a cured layer on a surface of the base member.

Next, the base member is moved by the predetermined liquid layer. Then, light is directed toward the photo-curable resin to form another cured layer on the cured layer formed above.

Such an operation of forming another cured layer on the cured layer formed previously is repeated. The cured layers are stacked in this manner to create a three-dimensional model. Japanese Laid-Open Patent Publication No. Hei 6-246838 discloses details of such a three-dimensional modeling device.

In order to form a cured layer by use of such a three-dimensional modeling device, a vector image, for example, is used. A vector image may be drawn by use of a projector that projects a two-dimensional image, an XY driving device that moves an image on a two-dimensional XY plane, a galvano-mirror or the like. A photo-curable resin is irradiated with laser light while a vector image is drawn, so that the photo-curable resin is cured to have a predetermined liquid layer thickness and a predetermined shape.

One cured layer is formed based on, for example, data representing a shape of the cured layer to be formed. For forming the cured layer, the three-dimensional modeling device first scans the photo-curable resin with laser light along a contour of the shape of the cured layer to be formed. The scanned portion of the photo-curable resin is cured to form the contour portion of the cured layer. Then, the three-dimensional modeling device scans an area inside the contour portion with laser light to cure the photo-curable resin in this area. Thus, the cured layer having a predetermined shape is formed.

The above-described data representing the shape of the cured layer is cross-sectional shape data representing a cross-sectional shape obtained when a target three-dimensional model to be formed is cut at a predetermined interval. In this specification, cross-sectional shape data representing a cross-sectional shape of a three-dimensional model will be referred to as "slice data".

In general, slice data is generated by a three-dimensional CAD (Computer-Aided Design) system. Slice data is generated from a polygon mesh of a target three-dimensional model to be formed. The polygon mesh is formed of a plurality of triangles. It should be noted that when a three-dimensional modeling device that generates slice data from a polygon mesh is used to perform a modeling process, the polygon mesh needs to fulfill conditions for providing a complete solid model. Herein, the expression "fulfill the conditions for providing a complete solid model" means a state where the plurality of triangles of the polygon mesh are connected to each other along a side and all the sides are each connected to two triangles.

There are cases where a polygon mesh actually used in a three-dimensional modeling device does not fulfill the conditions for providing a complete solid model described above. In such a case, the polygon mesh which does not fulfill the conditions for providing a complete solid model needs to be corrected to be formed into a polygon mesh fulfilling the conditions for providing a complete polygon mesh before slice data is generated. In order to correct the polygon mesh, an operator uses commercially available correction software or the like.

However, it is not easy for the operator to make corrections on the polygon mesh that are necessary to generate slice data by use of such commercially available correction software. This requires the operator to perform a high-level correction work, which is a problem.

In addition, commercially available correction software is highly costly and is not easy to purchase, which also constitutes a problem.

SUMMARY OF THE INVENTION

Preferred embodiments of the present invention provide a slice data generation device and a slice data generation method that are capable of generating slice data on a polygon mesh which does not fulfill conditions for providing a complete solid model without requiring a high-level correction work, and a non-transitory computer-readable storage medium storing a computer program that causes a computer to act as the slice data generation device or to execute the slice data generation method.

A slice data generation device according to a preferable embodiment of the present invention is a slice data generation device that generates slice data representing a cross-section obtained as a result of cutting a three-dimensional model. The slice data generation device includes a reading section configured to read information on a polygon mesh based on which the slice data is to be generated; a change section configured to change phase information on the read polygon mesh such that a contour polyline that represents a contour obtained as a result of slicing the polygon mesh read by the reading section into round slices is capable of being acquired; a correction section configured to acquire the contour polyline from the polygon mesh, the phase information on which has been changed by the change section, and correct the acquired contour polyline such that an area inside the acquired contour polyline is capable of being painted out; and a paint-out data generation section configured to paint out the area inside the contour polyline corrected by the correction section.

The term "phase information on the polygon mesh" refers to information on the connection of triangles which form a polygon mesh.

According to the above-described slice data generation device, slice data even on a polygon mesh which does not fulfill conditions for providing a complete solid model is capable of being generated without requiring a high-level correction work. Therefore, the operator does not need to perform a high-level correction work, and it is not necessary either to purchase costly correction software.

According to a preferable embodiment of the present invention, the polygon mesh includes a two-manifold. In the case where the polygon mesh read by the reading section includes a non-manifold, the change section changes the phase information on the read polygon mesh such that the non-manifold becomes a two-manifold.

According to another preferable embodiment of the present invention, in the case where at least two of a plurality of line segments included in the acquired contour polyline cross each other, the correction section, upon acquiring the contour polyline, separates the contour polyline at a point where the at least two line segments cross each other, and deletes a line segment left inside the contour polyline.

A slice data generation method according to a preferable embodiment of the present invention is a slice data generation method that generates slice data representing a cross-section obtained as a result of cutting a three-dimensional model. The slice data generation method includes the steps of reading information on a polygon mesh based on which the slice data is to be generated; changing phase information on the read polygon mesh such that a contour polyline that represents a contour obtained as a result of slicing the read polygon mesh into round slices is capable of being acquired; acquiring the contour polyline from the polygon mesh, the phase information on which has been changed, and correcting the acquired contour polyline such that an area inside the acquired contour polyline is capable of being painted out; and painting out the area inside the corrected contour polyline.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 shows boundary representation of the polygon mesh.

FIGS. 8a and 8b show a method for connecting line segments of the polygon mesh.

FIGS. 10a, 10b and 10c show a process of synthesizing polylines.

DETAILED DESCRIPTION OF THE PREFERRED EMBODIMENTS

Hereinafter, preferred embodiments of a slice data generation device, a slice data generation method, a computer program (hereinafter, the computer program will be referred to simply as a "program") that causes a computer to act as the slice data generation device or to execute the slice data generation method, and a non-transitory computer-readable storage medium storing the program will be described in detail with reference to the attached drawings.

Figure 1:
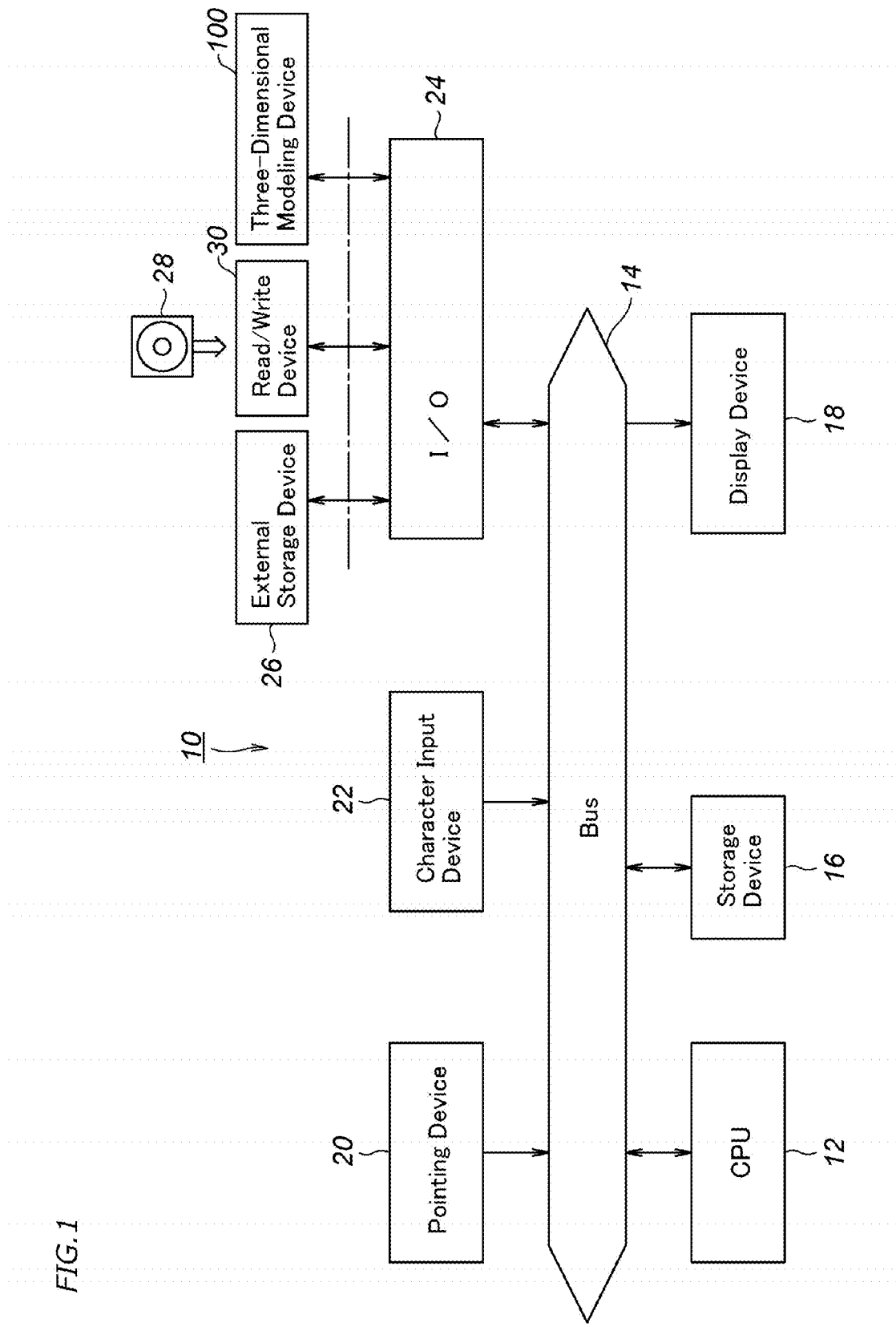
FIG. 1 is a block diagram showing an example of hardware configuration of a slice data generation device.

FIG. 1 is a block diagram showing an example of hardware configuration of a slice data generation device 10 in a preferred embodiment. The slice data generation device 10 is embodied by, for example, a known personal computer or general purpose computer. An operation of the slice data generation device 10 is controlled by a central processing unit (hereinafter, referred to as the "CPU") 12.

The slice data generation device 10 includes the CPU 12, a bus 14, a storage device 16, a display device 18, a pointing device 20, a character input device 22, and an input/output interface circuit (hereinafter, referred to as the "I/O") 24.

The storage device 16 is connected to the CPU 12 via the bus 14. The storage device 16 includes a read only memory (ROM) that stores, for example, a program that controls the CPU 12 and various data or the like, a random access memory (RAM) that includes, for example, a storage area usable as a working area for the CPU 12, and the like. The display device 18 includes a display screen using a CRT or a liquid crystal panel that provides various displays based on the control by the CPU 12. The pointing device 20 is an input device that specifies an arbitrary position on the display screen of the display device 18. The pointing device 20 includes a mouse or the like. The character input device 22 is an input device that inputs an arbitrary character. The character input device 22 includes a keyboard or the like. The I/O 24 transmits and receives a signal to and from any of various external devices connected thereto.

An external storage device 26 such as a hard disc or the like is connected to the slice data generation device 10 via the I/O 24. A read/write device 30 is connected to the slice data generation device 10 via the I/O 24. The read/write device 30 writes and stores various data generated based on the control by the CPU 12 onto a non-transitory computer-readable storage medium (hereinafter, referred to simply as the "storage medium") 28. The read/write device 30 also writes various data stored on the storage medium 28 onto the storage device 16. There is no specific limitation on the type of the storage medium 28. The storage medium 28 is, for example, a compact disc (CD), a digital versatile disc (DVD) or the like.

A three-dimensional generation modeling device 100 is connected to the slice data generation device 10 via the I/O 24. The three-dimensional modeling device 100 creates a three-dimensional model by use of slice data generated by the slice data generation device 10. The three-dimensional modeling device 100 may be a conventionally known three-dimensional modeling device, and thus will not be described in detail.

In the following description, it is assumed that a program usable to execute a process of generating slice data performed by the slice data generation device 10 and various data usable to execute the process of generating the slice data are stored on the storage device 16 in advance. Alternatively, the slice data generation device 10 may read the program and the data onto the random access memory of the storage device 16 by communication with an external device.

Figure 2:
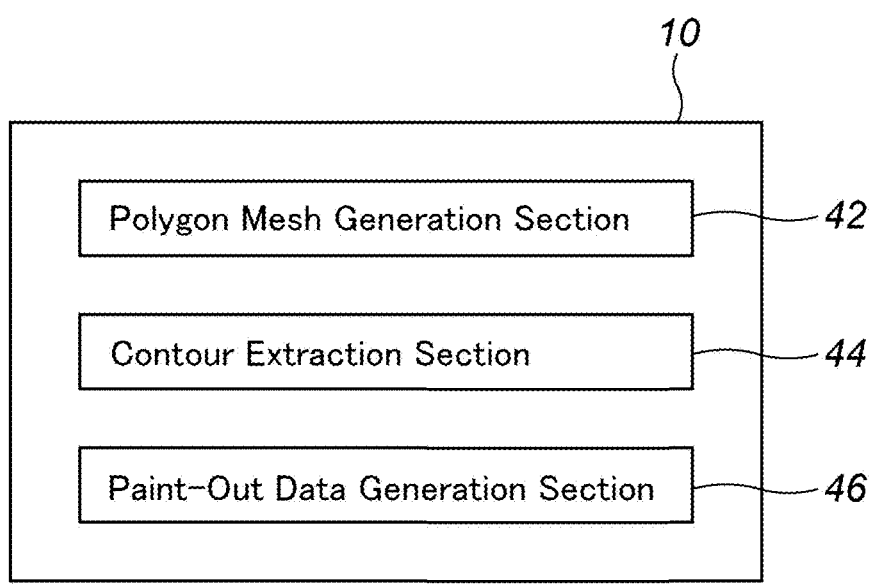
FIG. 2 is a block diagram showing an example of functional configuration of the slice data generation device.

Now, with reference to FIG. 2, the slice data generation device 10 for three-dimensional modeling in a preferred embodiment of the present invention will be described in detail. FIG. 2 is a block diagram showing an example of functional configuration of the slice data generation device 10.

The slice data generation device 10 generates slice data usable for optical modeling performed by the three-dimensional modeling device 100. The slice data generation device 10 generates slice data by reading data on a polygon mesh from an STL (Stereolithography) file.

As techniques of optical modeling usable by a three-dimensional modeling device, a raster method and a vector method are generally known. By the raster method, a projector that projects a two-dimensional image is used. By the vector method, a device that performs scanning with a laser pointer in an XY direction or a device that performs scanning at high speed with laser light by use of a galvanomirror is used. Slice data generated by the slice data generation device 10 is usable in three-dimensional modeling performed by a three-dimensional modeling device that adopts either the raster method or the vector method.

Figure 3:
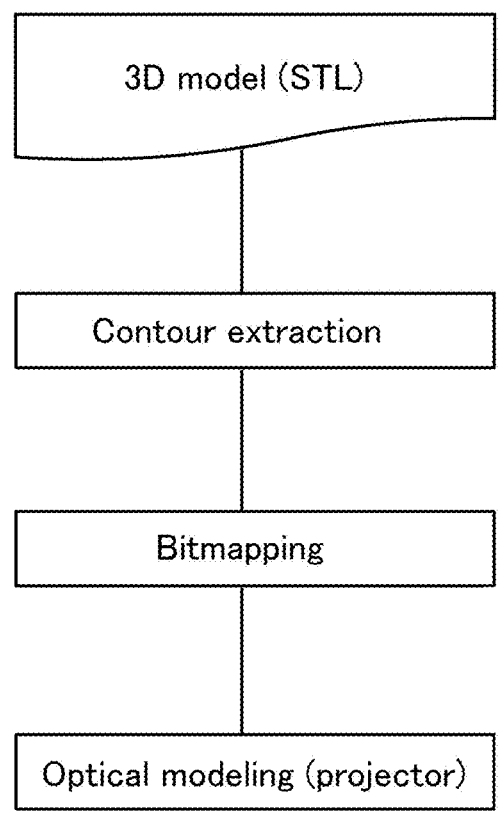
FIG. 3 is a flowchart showing a flow of processes from generation of slice data to optical modeling.

FIG. 3 is a flowchart conceptually showing a flow of processes from generation of slice data to optical modeling. The slice data generation device 10 first cuts a target three-dimensional model to be created into round slices from a bottom end to a top end thereof at a microscopic interval. As a result, a plurality of contour shapes are obtained. Next, a process of acquiring bitmap images of the plurality of contour shapes with inner areas thereof being painted out is performed.

As shown in FIG. 2, the slice data generation device 10 includes a polygon mesh generation section 42, a contour extraction section 44, and a paint-out data generation section 46. The polygon mesh generation section 42 reads a polygon mesh from an STL file usable for rapid prototyping. The polygon mesh is information based on which slice data is to be generated. The polygon mesh generation section 42 generates a polygon mesh processed with non-manifold correction or the like described later from the read polygon mesh. The contour extraction section 44 slices the polygon mesh generated by the polygon mesh generation section 42 to acquire contour shapes. The paint-out data generation section 46 paints out an inner area of each of the contour shapes, extracted by the contour extraction section 44, with bitmap data. Data generated by the paint-out data generation section 46 is output to the three-dimensional modeling device 100 as slice data usable for optical modeling performed by the three-dimensional modeling device 100.

Hereinafter, processes performed by the polygon mesh generation section 42, the contour extraction section 44 and the paint-out data generation section 46 will be described in detail.

(1) Process Performed by the Polygon Mesh Generation Section 42

Figure 4:
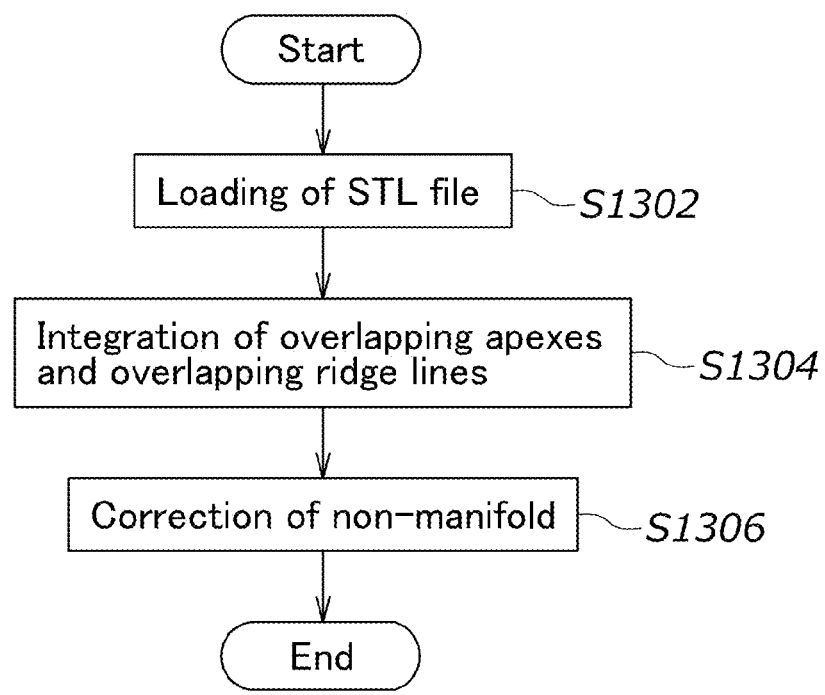
FIG. 4 is a flowchart showing a process performed by a polygon mesh generation section.

The polygon mesh generation section 42 first reads information on a polygon mesh from an STL file. Next, the polygon mesh generation section 42 makes an adjustment, on the read polygon mesh, that is necessary to generate slice data. Hereinafter, with reference to a flowchart in FIG. 4, the technological contents of the process performed by the adjustment that is necessary to generate slice data will be described in detail.

First, for easier understanding of the following description, boundary representation of a polygon mesh used as an inner area representation method necessary to generate slice data will be described. As shown in FIG. 5, the slice data generation device 10 manages information on the polygon mesh with known boundary representation. Apex ($V_i$) has a three-dimensional coordinate value (geometric information). Ridge line ($E_i$) has information on apexes of two ends thereof (phase information). Plane ($F_i$) has information on three ridge lines enclosing the plane (phase information). The order of information on the ridge lines enclosing plane ($F_i$) are clockwise as seen in a direction in which a normal vector to the plane advances.

(1-1) Loading (Reading) of an STL File . . . Step S1302

The polygon mesh generation section 42 first loads an STL file to read information on the polygon mesh. The formatting specifications of the STL file are known and will not be described in detail. In conformity with the formatting specifications of the STL file, the polygon mesh generation section 42 generates data on the apexes and planes such that boundary representation of the polygon mesh is provided. At the same time, the polygon mesh generation section 42 generates data on three ridge lines that form each plane. The above-described processes of generating the data on the apexes, planes and ridge lines are known and will not be described in detail. The polygon mesh generation section 42 performing the process in step S1302 is an example of "reading section".

(1-2) Integration of Overlapping Apexes and Overlapping Ridge Lines . . . Step S1304

In the state of the data generated in step S1302, planes adjacent to each other have two pairs of apexes having the same coordinate values, namely, overlapping apexes. Thus, a process of integrating each pair of the overlapping apexes into one is performed. When this process is performed, information on the apexes of each ridge line is updated. Planes adjacent to each other also have overlapping ridge lines because the ridge lines extend between the two pairs of overlapping apexes. Thus, the overlapping ridge lines are integrated into one, and phase information on the ridge lines of each plane is updated. The process of integrating the overlapping apexes and the process of integrating the overlapping ridge lines are known and will not be described in detail.

(1-3) Non-Manifold Correction . . . Step S1306

A polygon mesh handled for a solid model is a two-manifold; namely, two triangles are necessarily connected to one ridge line. However, in the case where, for example, the coordinate values of the apexes are very close to each other, four or more triangles may be connected to one ridge line. Such a three-dimensional model is referred to as a "non-manifold". When, in step S1304, the processes of integrating the overlapping apexes and the overlapping ridge lines are performed in a simple manner, the polygon mesh may become a non-manifold.

Figure 6A:
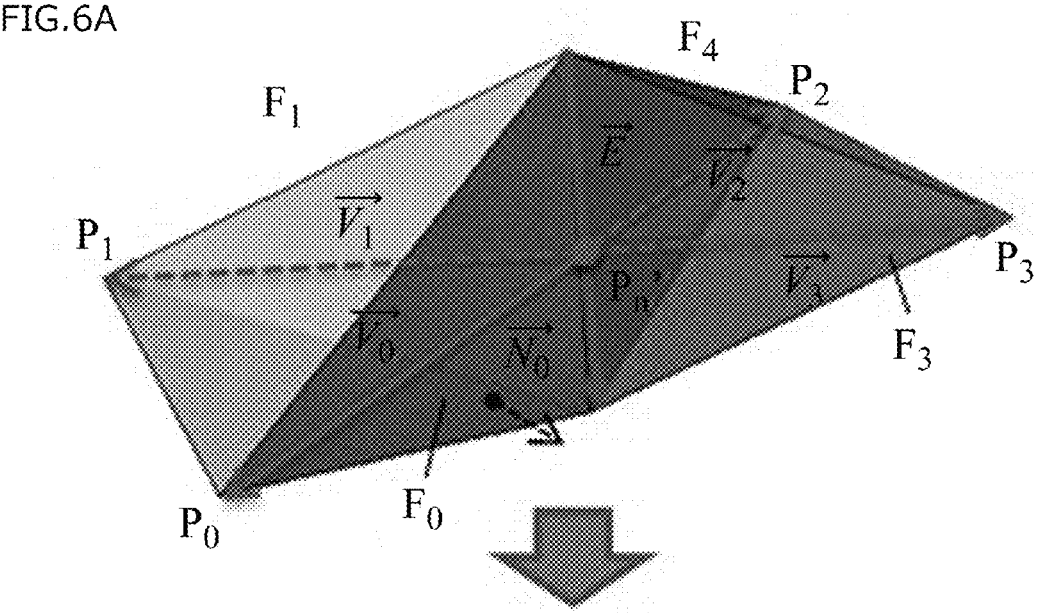
FIGS. 6a and 6b show a process of non-manifold correction.

For example, FIG. 6a shows an example in which two tetrahedrons are close to each other and as a result, ridge lines which should be separate overlap each other. In this case, in the process performed by the contour extraction section 44, a contour polyline described later is not acquired normally. Specifically, when intersections of a slice plane (i.e., plane, the normal vector to which is parallel to the Z axis) and each ridge line are connected to each other in accordance with the connection information on the plane, the connection direction is branched into a plurality of directions at the ridge line. This results in unstable acquirement of the contour polyline. Namely, the acquisition may be finished without all the intersections being tracked.

Figure 6B:
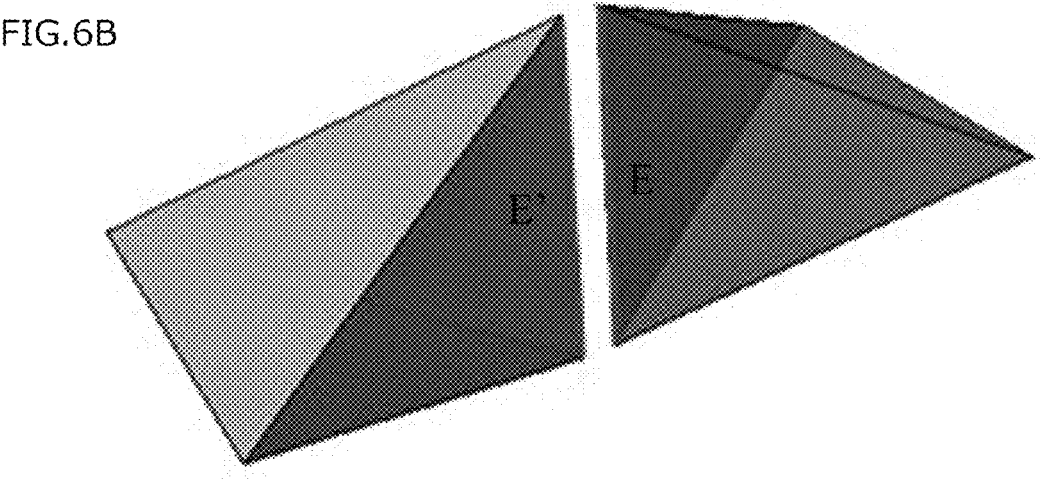

Now, FIG. 6b is referred to. In order to avoid the above-described situation, in the case where there is a ridge line E to which four or more planes are connected, a duplicate ridge line E' is formed. The phase information is changed such that two planes are connected to each of the ridge lines E and E'. The two planes to be connected to each of the ridge lines E and E' are selected as follows. One plane connected to each ridge line is selected first, and a plane which is closest to the selected one plane among the planes on the other side of the selected one plane is selected. As a result, in the example shown in FIGS. 6a and 6b, planes that form one tetrahedron which should be property formed are selected, and phase information on the ridge lines to be connected to the selected planes is re-configured. The polygon mesh generation section 42 performing the processes in steps S1304 and S1306 is an example of "change section".

Next, a method for selecting a plane which is closest to the selected one plane among the planes on the other side of the selected one plane will be described. In the following description, "n" represents "number of planes connected to the ridge line−1". In the example shown in FIGS. 6a and 6b, "n=3".

(I) For each of planes $F_0$ to $F_n$ connected to the ridge line, apexes $P_0$ to $P_n$, which do not belong to the ridge line are selected.

(II) Perpendicular lines $P'_0$ to $P'_n$ extending from apexes $P_0$ to $P_n$ to the ridge line are determined.

(III) The outer product $$\vec{E}$$

of the unit vector of $$\vec{V_0}$$

or $$\overrightarrow{P_0 P'_0}$$

and the reverse vector of the normal line to the plane $$\vec{N_0}$$

is determined. This is expressed as:

$$\vec{E} = \vec{V_0} \times \vec{N_0}$$

(IV) A vector that is present at the closest angle is selected from $$\vec{V_i} = \overrightarrow{P'_i P_i} (i=1 \sim n)$$

in the clockwise direction of $$\vec{E}$$

from $$\vec{V_0}$$

is selected.

Here, the angle may be evaluated by the magnitude of the numerical value determined as follows.

$$angle_i = \begin{cases} 1 - dot_i, & \text{if } \vec{V_0} \times \vec{V_i} = \vec{E} \\ 3 + dot_i, & \text{otherwise} \end{cases}$$

where $$dot_i = \vec{V_0} \cdot \vec{V_i}$$

$dot_i$ is the inner product of $$\vec{V_0}$$

and $$\vec{V_i}$$

When the outer product of $$\vec{V_0}$$

and $$\vec{V_i}$$

is in the same direction as $$\vec{E}$$

$1-dot_i$ is determined; and otherwise, $3+dot_i$ is determined.

The value obtained in this manner is in the range of 0 or greater and less than 4. The obtained value is in proportion to an angle that is 0 degrees or greater and less than 360 degrees, and represents the magnitude of an angle from $$\vec{V_0}$$

to $$\vec{V_i}$$

where $$\vec{E}$$

is positive and clockwise.

In the example shown in FIGS. 6a and 6b, $$\vec{V_1}$$

is selected as the closest vector. As a result, plane $F_1$ is selected as the plane to be paired with plane $F_0$. The phase information on two selected planes $F_0$ and $F_1$ is moved to ridge line E', which is a duplicate of ridge line E. In FIG. 6b, ridge lines E and E' are drawn as being separated from each other in order to represent that ridge lines E and E' are cut away from each other. In actuality, however, the coordinate values of ridge lines E and E' are not different from each other. The ridge line element is duplicated while the apex elements thereof are kept the same.

In the case where six or eight triangles (i.e., planes) are connected to one ridge line, the above-described operation of ridge line separation is repeated until the number of planes connected to each of all the ridge lines becomes 2. As a result of this operation, only the ridge lines are duplicated while the apex elements are kept the same. Such phase information is not correct for a solid model. However, the purpose of this operation is to find the intersections of the slice plane and the ridge lines and to obtain the information on the connection thereof. Therefore, the above-described phase information is to be used.

(2) Process Performed by the Contour Extraction Section 44

The contour extraction section 44 cuts the polygon mesh, generated by the process performed by the polygon mesh generation section 42, along a plane at an arbitrary Z coordinate. The contour extraction section 44 performs a process of acquiring a contour shape obtained when the polygon mesh is thus cut (hereinafter, the contour shape will be referred to also as a "contour polyline"). The contour extraction section 44 also performs a process of deleting the intersections and the like such that an inner area of the contour polyline is capable of being properly painted out and mapping the resultant contour shape to the coordinate system of output data. The contour extraction section 44 is an example of "correction section".

Figure 7:
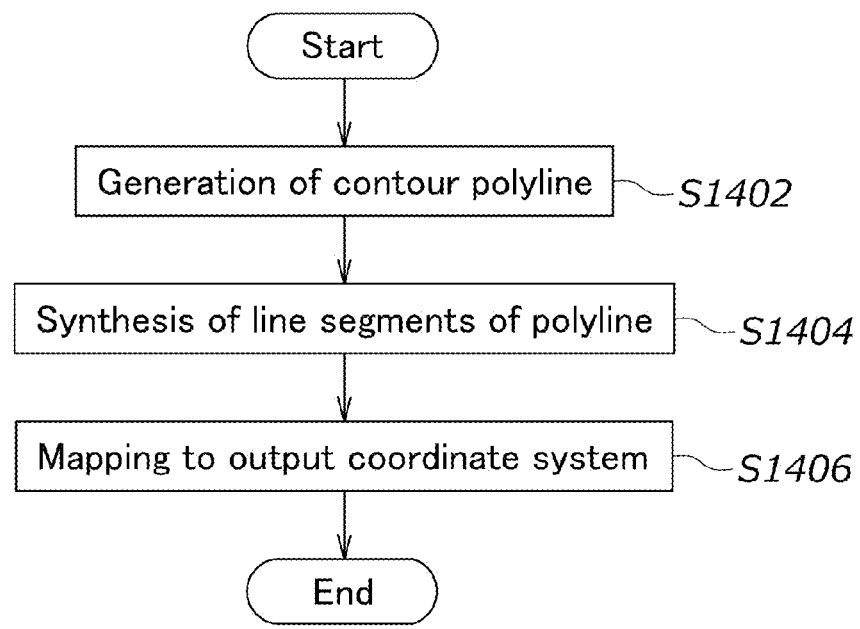
FIG. 7 is a flowchart showing a process performed by a contour extraction section.

Hereinafter, the technological contents of the process performed by the contour extraction section 44 will be described in detail with reference to a flowchart in FIG. 7.

(2-1) Generation of Contour Polyline . . . Step S1402

(2-1-1) Intersections of Ridge Lines and a Slice Plane

An intersection of each of the ridge lines of the polygon mesh generated by the process performed by the polygon mesh generation section 42 and a slice plane (i.e., plane, the normal vector to which is parallel to the Z axis) is determined. The results may be stored in association with each of the ridge lines.

(2-1-2) Connection of the Intersections to Generate a Contour Polyline

The advancing direction of a contour polyline is clockwise when seen downward along the Z axis of the polygon mesh. Now, attention is paid to a ridge line associated with a coordinate value of an intersection. In the case where the other ridge line of a plane connected to the ridge line is also associated with a coordinate value of an intersection, the two intersections are connected to each other to acquire one line segment. The direction in which the intersections are connected is determined as follows.

When the top end points of the two ridge lines in the Z axis direction have the same coordinate value (see FIG. 8a), the start point and the end point of the connection are selected such that the rotation direction from the downward vector of the ridge line at the end point side $\vec{V_1}$ to the downward vector of the ridge line on the start point side $\vec{V_0}$ is the same as the direction of the normal vector to the plane $\vec{N}$ Such a process is repeated until the selected intersections return to the intersections at which the tracking was started.

When the bottom end points of the two ridge lines in the Z axis direction have the same coordinate value (see FIG. 8b), the start point and the end point of the connection are selected such that the rotation direction from the upward vector of the ridge line at the start point side $\vec{V_1}$ to the upward vector of the ridge line on the end point side $\vec{V_0}$ is the same as the direction of the normal vector to the plane $\vec{N}$ Such a process is repeated until the selected intersections return to the intersections at which the tracking was started.

(2-2) Synthesis of Line Segments of the Polyline . . . Step S1404

Next, a preparation is performed for painting out an inner area of the polyline of the cross-section acquired by the above-described process. It is ideal that the phase information on the polygon mesh for a solid model used in rapid prototyping does not include any contradiction. When such a model is cut along a plane, the contour of the plane is one polyline which is completely closed with no intersection. Therefore, it is easy to paint out the inner area thereof by use of a conventionally known scan conversion process or the like.

Figure 9:
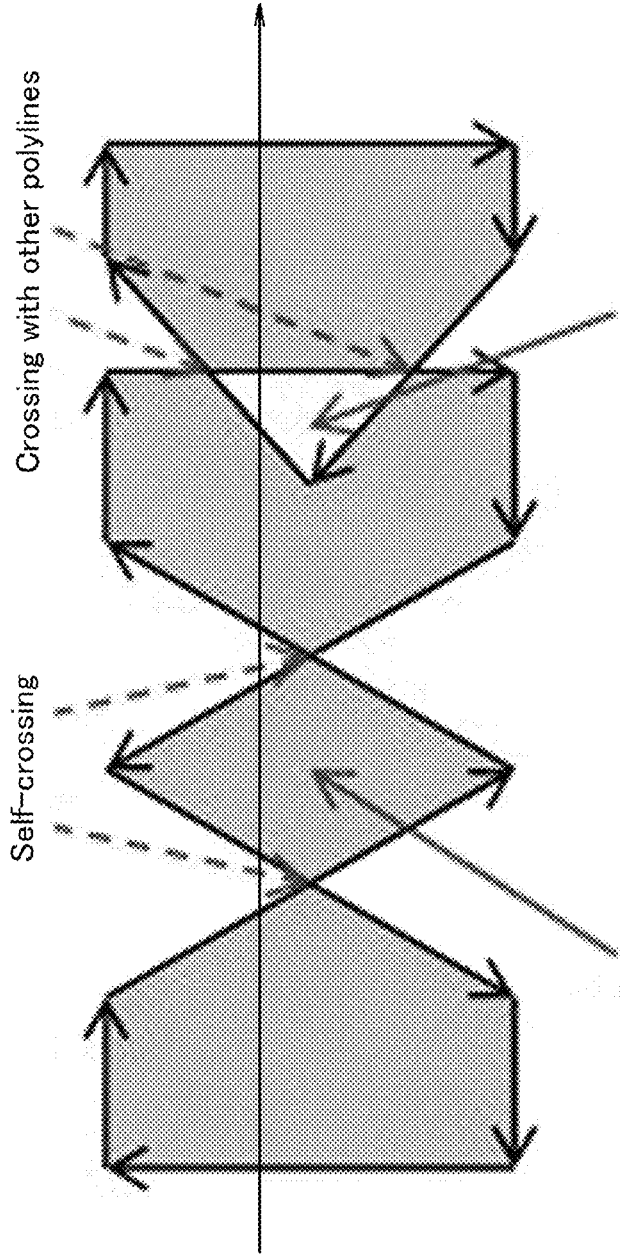
FIG. 9 shows paint-out results performed by use of scan conversion in the case where polylines cross each other.

However, STL data actually used in a CAD system or the like includes an area where many microscopic polygons are gathered and the coordinate values are very close to each other. This may result in self-crossing of a polyline. In addition, there are many cases where a plurality of shapes overlap each other. In such a case, a plurality of polylines intersect each other. In a process of painting out the inner areas of the polylines in such a state by use of a simple scan conversion process, it is determined whether or not the area is inside or outside the polyline each time the line segments of polylines cross each other. Therefore, an inner area of the model which should be painted out may not be painted out correctly (FIG. 9).

Therefore, in the process of synthesizing polylines in step S1404, a polyline is separated into a plurality of line segments at such an intersection, and the line segment left inside is deleted. Thus, the other line segments are synthesized into one polyline tracking only the outer contour of the model.

(2-2-1) Deletion of Self-Crossing (See FIG. 10a)

First, a separation and synthesis process described below is performed on one polyline. In the case where there are a plurality of polylines, the separation and synthesis process is performed on each of the polylines.

(I) Separation of a Polyline at a Self-Crossing Point

Each polyline is separated into a plurality of line segments at a self-crossing point. The separated line segments are each opened at an end point thereof.

(II) Determination on the Reversed or Overlapping Portion and Deletion Thereof

The following process is repeated on a certain line segment.

(i) A scan line passing a middle coordinate point of the certain line segment is drawn in an X or Y direction, and the coordinate values of intersections of the certain line segment and all the line segments crossing the certain line segment are determined.

(ii) The intersections on the scan line are sorted in an ascending order of the coordinate values.

(iii) For each intersection, an inside/outside determination value by which a line segment is determined as being inside or outside is set as follows. An outer product of a direction vector of the scan line and a direction vector of a line segment to which the intersection belongs is determined. When the z component of the outer product is positive (direction from the rear surface of the sheet of paper toward the front surface thereof in FIG. 10), "ON" is set; whereas when the Z component of the outer product is negative (direction from the front surface of the sheet of paper toward the rear surface thereof in FIG. 10), "OFF" is set.

(iv) Paint-out statuses are set for the intersections, starting from an intersection having the smallest coordinate value. The first status value is set to "0". When the inside/outside determination result of the intersection is "ON", "1" is added; whereas when the inside/outside determination result of the intersection is "OFF", "1" is subtracted.

(v) In the case where the inside/outside determination result of the intersection to which a line segment of interest belongs is "OFF" and the status value is "−1 or less" or in the case where the inside/outside determination result of the intersection to which the line segment belongs is "ON" and the status value is "0 or less", the line segment is turned inside out and is not a portion of a proper contour that should enclose the model. Therefore, this line segment is deleted. In the case where the inside/outside determination result of the intersection to which a line segment of interest belongs is "OFF" and the status value is "1 or greater" or in the case where the inside/outside determination result of the intersection to which the line segment belongs is "ON" and the status value is "2 or greater", the line segment is overlapping. Therefore, this line segment is deleted. In summary, the line segments to be deleted may be determined as follows.

Inside/outside determination result: OFF; status: other than 0; or
Inside/outside determination result: ON; status: other than 1

(2-2-2) Resolution of Crossing with Other Polylines (See FIG. 10b)

After the self-crossing of each closed polyline is resolved, crossing with other polylines is resolved. In this case, there is no line segment turned inside out unlike in the case of self-crossing, but there may be an overlapping line segment. Resolution of crossing with other polylines preferably is performed by determination using a scan line like in the case of the self-crossing.

(2-2-3) Synthesis (see FIG. 10c)

After the determination and deletion process is finished on all the line segments, the remaining open line segments are connected to form a closed polyline.

(2-3) Mapping to the Output Coordinate System . . . Step S1406

Next, the contour polyline synthesized by the process of (2-2-3) described above is assigned to a coordinate system of an image to be output in a bitmap form.

(2-3-1) Transformation of a World Coordinate Value into a Coordinate Value of an Output Image Coordinate System The world coordinate value is set to $(X_w, Y_w)$. The image coordinate scaling coefficient is set to $(s_x, s_y)$. A parallel translation amount of the origin of the image coordinate system is set to $(t_x, t_y)$. An image coordinate value (u, v) is determined by the following expression.

$$\begin{bmatrix} u \\ v \\ 1 \end{bmatrix} = H \begin{bmatrix} X_w \\ Y_w \\ 1 \end{bmatrix}, H = \begin{bmatrix} s_t & 0 & t_x \\ 0 & s_y & t_y \\ 0 & 0 & 1 \end{bmatrix} \quad (1)$$

Figure 11A:
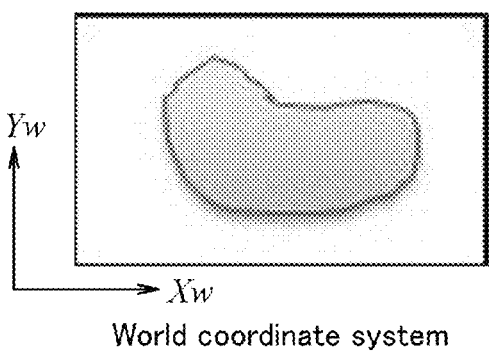
FIGS. 11a, 11b and 11c show the relationship between a world coordinate system and an image coordinate system.
Figure 11B:
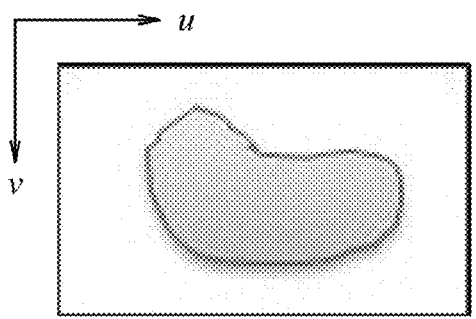
Figure 11C:
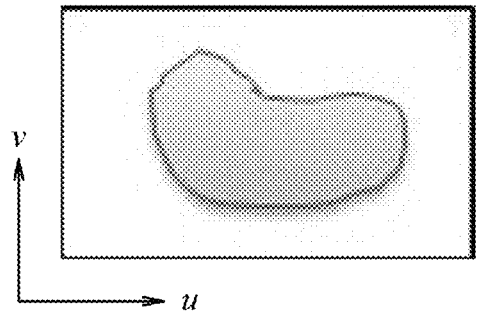

As shown in FIGS. 11b and 11c, there are two types of image coordinate systems; one is for bitmap and the other is for vector. FIG. 11a shows the world coordinate system. For each coordinate system, a transformation matrix H is determined.

Where the width and the height of the world coordinate system are respectively W [mm] and H [mm] and the width and height of the image coordinate system for bitmap are respectively $w_{bmp}$ and $h_{bmp}$, parameters of the transformation matrixes H are as follows.

$$\begin{cases} s_y = w_{bmp}/W \\ s_y = -h_{bmp}/H \end{cases} \quad \begin{cases} t_x = 0 \\ t_y = h_{bmp} \end{cases}$$

For each of $w_{bmp}$ and $h_{bmp}$, the image size of a projector is used.

(2-3-2) Correction of Lens Distortion at a Coordinate Value

When a projector is used to form a model, the image coordinate value is changed by use of a distortion coefficient that has been investigated. From the image coordinate value, a corresponding world coordinate value is calculated. The relationship between the proper image coordinate value (u, v) and the image coordinate value $(u_d, v_d)$ after the lens is distorted in a radiation direction is represented by the following expressions.

$$\begin{cases} u_d = u + (u - u_0)(1 + k_1 r^2 + k_2 r^4) \\ v_d = v + (v - v_0)(1 + k_1 r^2 + k_2 r^4) \end{cases} \quad (2)$$

In the above expressions, $(u_0, v_0)$ represents the central coordinate value of the distortion in the radiation direction. $r^2 = x^2 + y^2$, x, y represents the normalized image coordinate value. $k_1$ and $k_2$ are radiation-direction distortion coefficients which should be determined in advance.

In a preferred embodiment according to the present invention, it is intended to reversely correct the coordinate value distorted by the lens, so that the post-projection coordinate value becomes the proper coordinate value. For this purpose, inverse transformation of expression (2) above is performed. For this process, a solution of the cubic equation by the Newton's method is used.

(2-3-3) Clipping in a Range of the Image Coordinate System

Figure 12:
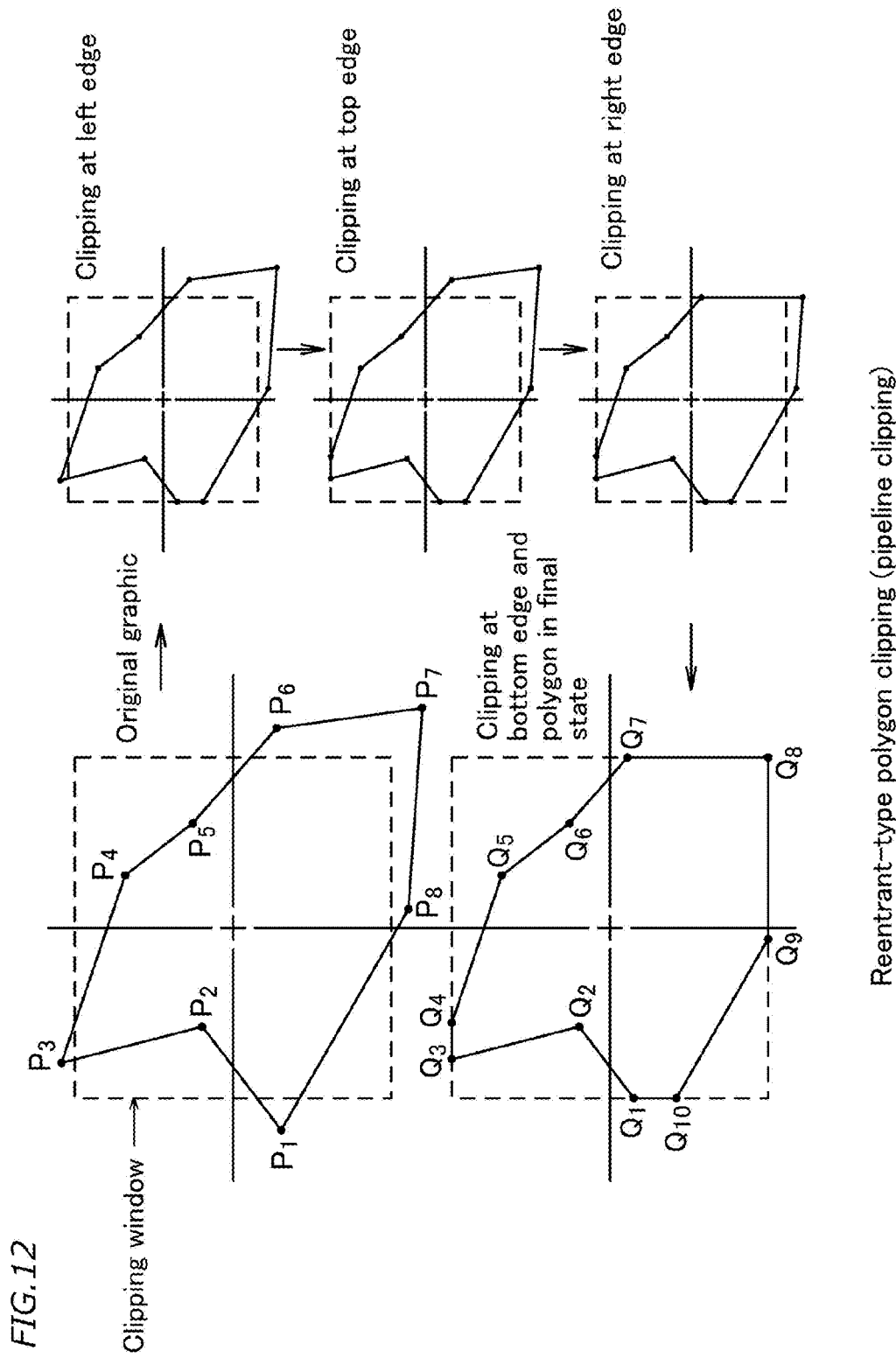
FIG. 12 shows a process of reentrant-type polygon clipping (pipeline clipping).

In the case where the entire contour polyline of a three-dimensional model is not accommodated within the output image coordinate system, the polyline is clipped at a border line. FIG. 12 shows a process of known reentrant-type polygon clipping (pipeline clipping) process. As shown in FIG. 12, the polyline is clipped at a top side, a bottom side, a left side and a right side of a range of the image coordinate system in this order. There is no specific limitation on the order of the sides at which the polyline is clipped.

(3) Process Performed by the Paint-Out Data Generation Section 46

The paint-out data generation section 46 generates bitmap data representing the above-acquired contour polyline having the inner area painted out. Specifically, the paint-out data generation section 46 generates bitmap data representing the area enclosed by the contour polyline being painted out by a process based on known scan conversion. Hereinafter, the technological contents of the process performed by the paint-out data generation section 46 will be described in detail.

(3-1) Generation of Pixel Database

Figure 13:
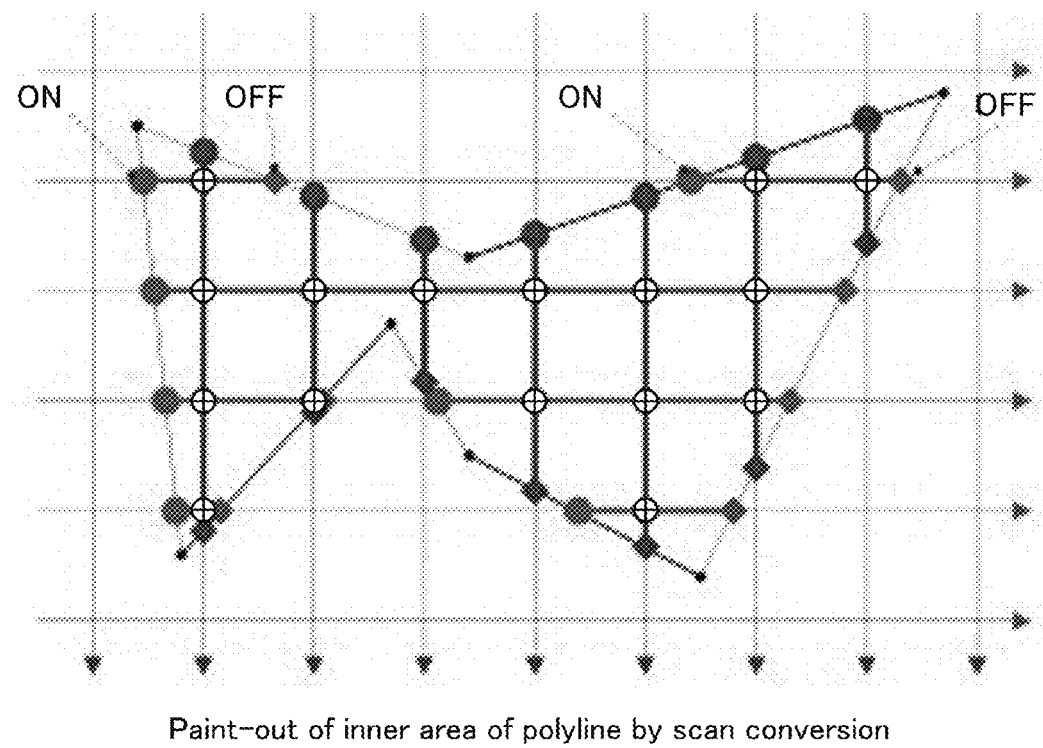
FIG. 13 shows a process of painting out an inner area of a polyline by use of scan conversion.

FIG. 13 shows a process of painting out an inner area of a polyline by use of scan conversion. In FIG. 13, one square cell represents one pixel of a bitmap image. The paint-out data generation section 46 generates data representing whether or not each of edges of each pixel is in the area enclosed by the polyline. For example, the coordinate value of an intersection of each edge of each pixel and the polyline is calculated. A transverse/longitudinal scan line along the edges of the pixels is drawn from a smaller coordinate value to a larger coordinate value. Each time the scan line passes the intersection coordinate value, an "ON" status or an "OFF" status is set alternately for the intersection. The corners of the pixels which are present between an "ON" intersection to an "OFF" intersection are inside the polyline. For these corners, the "IN" status is set (white circles in FIG. 13). The other corners of the pixels are outside the polyline, and the "OUT" status is set for these corners.

(3-2) Setting of a Luminance Value for Each Pixel of the Bitmap

In accordance with the "IN"/"OUT" status, a luminance value of each pixel in the 8-bit grayscale bitmap is set as follows. For example, when at least one of four corners of a pixel is "IN", the luminance value of the pixel is set to 255; and otherwise, the luminance value of the pixel is set to 0.

The slice data generation device 10 outputs the data generated by the paint-out data generation section 46 to the three-dimensional modeling device 100 as slice data for optical modeling.

Figure 14:
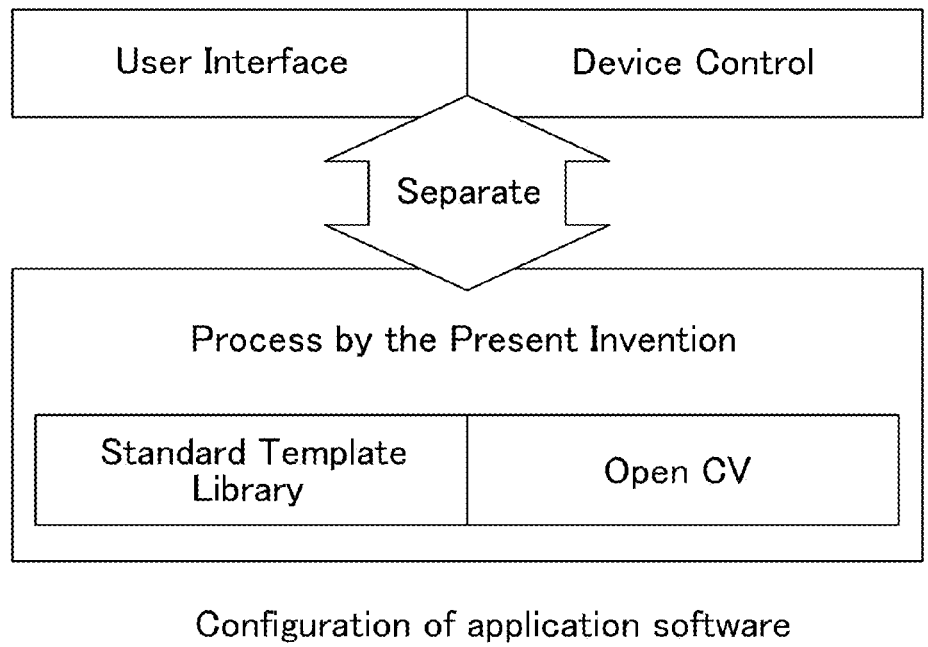
FIG. 14 shows a configuration of application software.

For actually mounting a program of a series of processes of generating slice data for three-dimensional modeling described above, only an STL (Standard Template Library) and an Open CV library, which are common libraries, may be used so as not to rely on any specific platform. In this way, mounting in accordance with a certain specific platform preferably is performed only to control the user interface and the three-dimensional modeling device 100 (see FIG. 14). This makes it easier to mount the program on various platforms. For example, a program using a technique according to a preferred embodiment of the present invention preferably is incorporated into software of calculating and acquiring slice data for three-dimensional modeling from a polygon mesh for a solid model.

Although not described in detail above, a contour shape obtained by slicing a three-dimensional model from a top end to a bottom end thereof at a certain interval preferably is displayed on the display device 18. This makes the work of an operator easier and also provides a sense of relief to the operator. On the display device 18, only an external shape obtained by automatic correction preferably is displayed so that the inner area thereof is capable of being painted out normally.

According to the techniques of various preferred embodiments of the present invention, slice data on a polygon mesh that does not fulfill the conditions for providing a complete solid model is generated without any high-level correction work. Therefore, the techniques of various preferred embodiments of the present invention do not require any special software to correct the polygon mesh. In addition, the operator does not need to have a high-level skill of operating the software.

According to the techniques of various preferred embodiments of the present invention, a contour shape which has been corrected by the processes of various preferred embodiments of the present invention is displayed before three-dimensional modeling. This allows the operator to understand that three-dimensional modeling is possible and thus relieves the operator.

The techniques of various preferred embodiments of the present invention are applicable to various products that performs drawing by use of the raster method as well as to any optical modeling device. The techniques of various preferred embodiments of the present invention are easily transplanted to various platforms.

Various preferred embodiments of the present invention are applicable to generate slice data usable for various types of devices such as, for example, a three-dimensional modeling device that creates a three-dimensional model by use of a photo-curable resin.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A slice data generation device that generates slice data representing a cross-section obtained as a result of cutting a three-dimensional model, the slice data generation device comprising:
    a reading section that reads information on a polygon mesh based on which the slice data is to be generated;
    a change section that changes phase information on the read polygon mesh such that a contour polyline that represents a contour obtained as a result of slicing the polygon mesh read by the reading section into round slices is capable of being acquired;
    a correction section that acquires the contour polyline from the polygon mesh, the phase information on which has been changed by the change section, and corrects the acquired contour polyline such that an area inside the acquired contour polyline is capable of being painted out; and
    a paint-out data generation section that paints out the area inside the contour polyline corrected by the correction section; wherein
    the polygon mesh includes a two-manifold;
    when the polygon mesh read by the reading section includes a non-manifold, the change section changes the phase information on the read polygon mesh such that the non-manifold becomes a two-manifold; and
    the reading section, the change section, the correction section, and the paint-out data generation section are implemented by a central processing unit.

2. A slice data generation device according to claim 1, wherein when at least two of a plurality of line segments included in the acquired contour polyline cross each other, the correction section, upon acquiring the contour polyline, separates the contour polyline at a point where the at least two line segments cross each other, and deletes a line segment left inside the contour polyline.

3. A slice data generation method that generates slice data representing a cross-section obtained as a result of cutting a three-dimensional model, the slice data generation method comprising the steps of:

reading information on a polygon mesh based on which the slice data is to be generated;

changing phase information on the read polygon mesh such that a contour polyline that represents a contour obtained as a result of slicing the read polygon mesh into round slices is capable of being acquired;

acquiring the contour polyline from the polygon mesh, the phase information on which has been changed, and correcting the acquired contour polyline such that an area inside the acquired contour polyline is capable of being painted out; and painting out the area inside the corrected contour polyline; wherein the steps of reading, changing, acquiring, correcting, and painting are executed by a central processing unit; wherein the polygon mesh includes a two-manifold; and when the polygon mesh read by the reading step includes a non-manifold, the step of changing changes the phase information on the read polygon mesh such that the non-manifold becomes a two-manifold.

4. A slice data generation method according to claim 3, wherein when at least two of a plurality of line segments included in the acquired contour polyline cross each other, the step of correcting, upon acquiring the contour polyline, separates the contour polyline at a point where the at least two line segments cross each other, and deletes a line segment left inside the contour polyline.

5. A non-transitory computer-readable storage medium storing a computer program that causes a computer to act as a slice data generation device that generates slice data, the slice data generation device including:

a reading section that reads information on a polygon mesh based on which the slice data is to be generated;

a change section that changes phase information on the read polygon mesh such that a contour polyline that represents a contour obtained as a result of slicing the polygon mesh read by the reading section into round slices is capable of being acquired;

a correction section that acquires the contour polyline from the polygon mesh, the phase information on which has been changed by the change section, and corrects the acquired contour polyline such that an area inside the acquired contour polyline is capable of being painted out; and a paint-out data generation section that paints out the area inside the contour polyline corrected by the correction section; wherein:

the polygon mesh includes a two-manifold; and when the polygon mesh read by the reading section includes a non-manifold, the change section changes the phase information on the read polygon mesh such that the non-manifold becomes a two-manifold.

6. A non-transitory computer-readable storage medium storing a computer program that causes a computer to perform a slice data generation method that generates slice data, the slice data generation method comprising the steps of:

reading information on a polygon mesh based on which the slice data is to be generated;

changing phase information on the read polygon mesh such that a contour polyline that represents a contour obtained as a result of slicing the read polygon mesh into round slices is capable of being acquired;

acquiring the contour polyline from the polygon mesh, the phase information on which has been changed, and correcting the acquired contour polyline such that an area inside the acquired contour polyline is capable of being painted out; and painting out the area inside the corrected contour polyline; wherein the polygon mesh includes a two-manifold; and when the polygon mesh read by the reading step includes a non-manifold, the step of changing changes the phase information on the read polygon mesh such that the non-manifold becomes a two-manifold.

* * * * *